P. R. DITSLER.
STEAM ENGINE.
APPLICATION FILED NOV. 7, 1913.

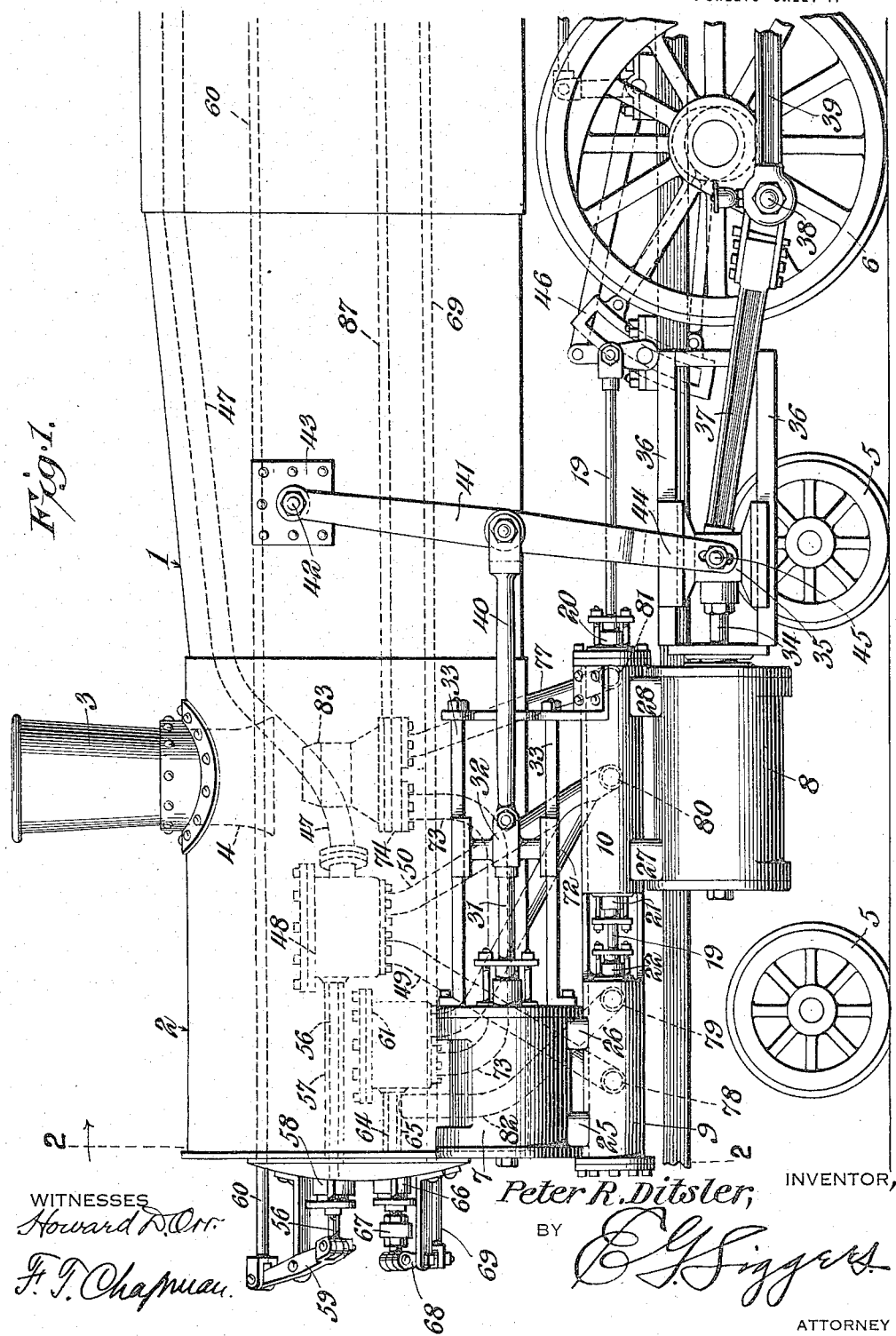

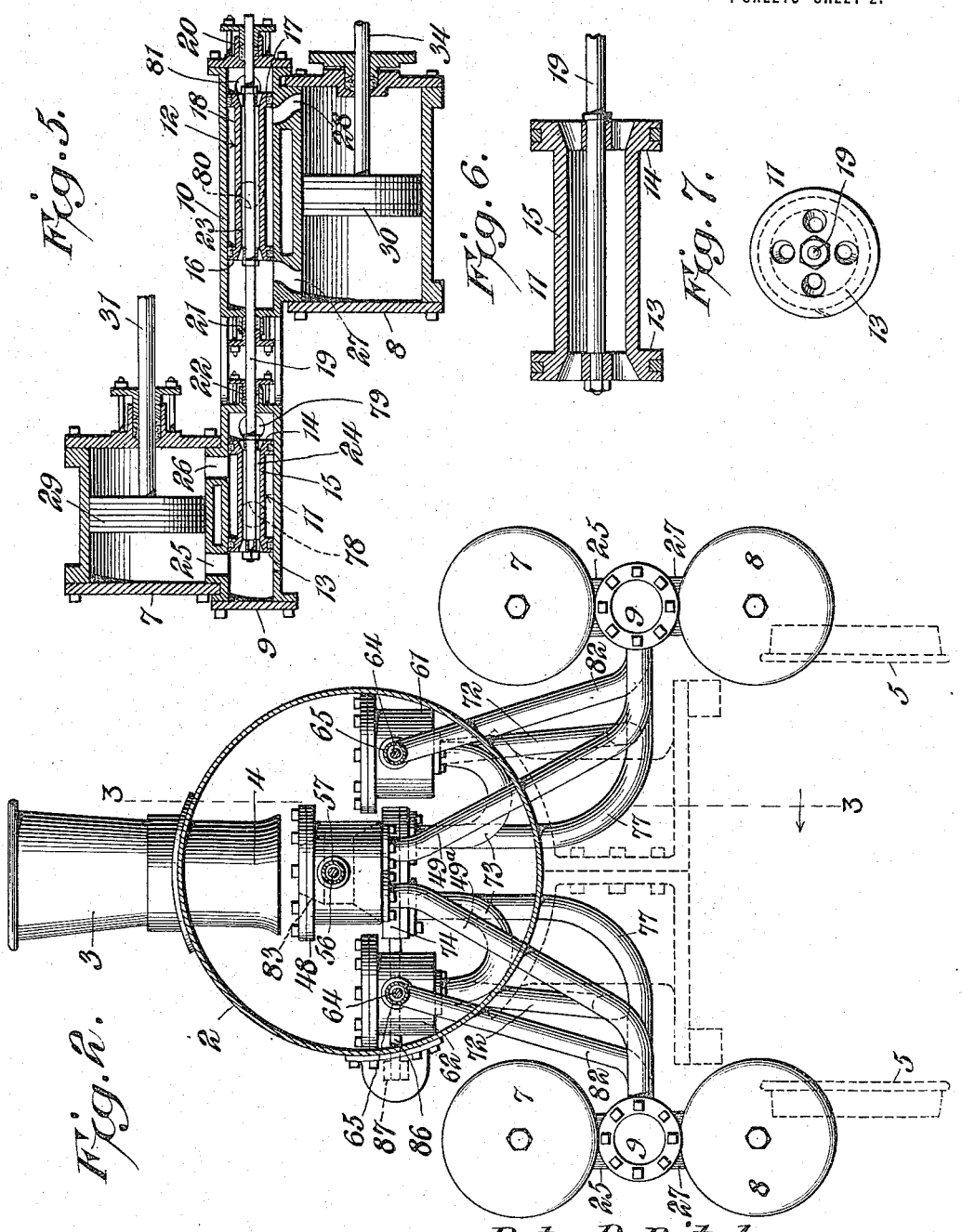

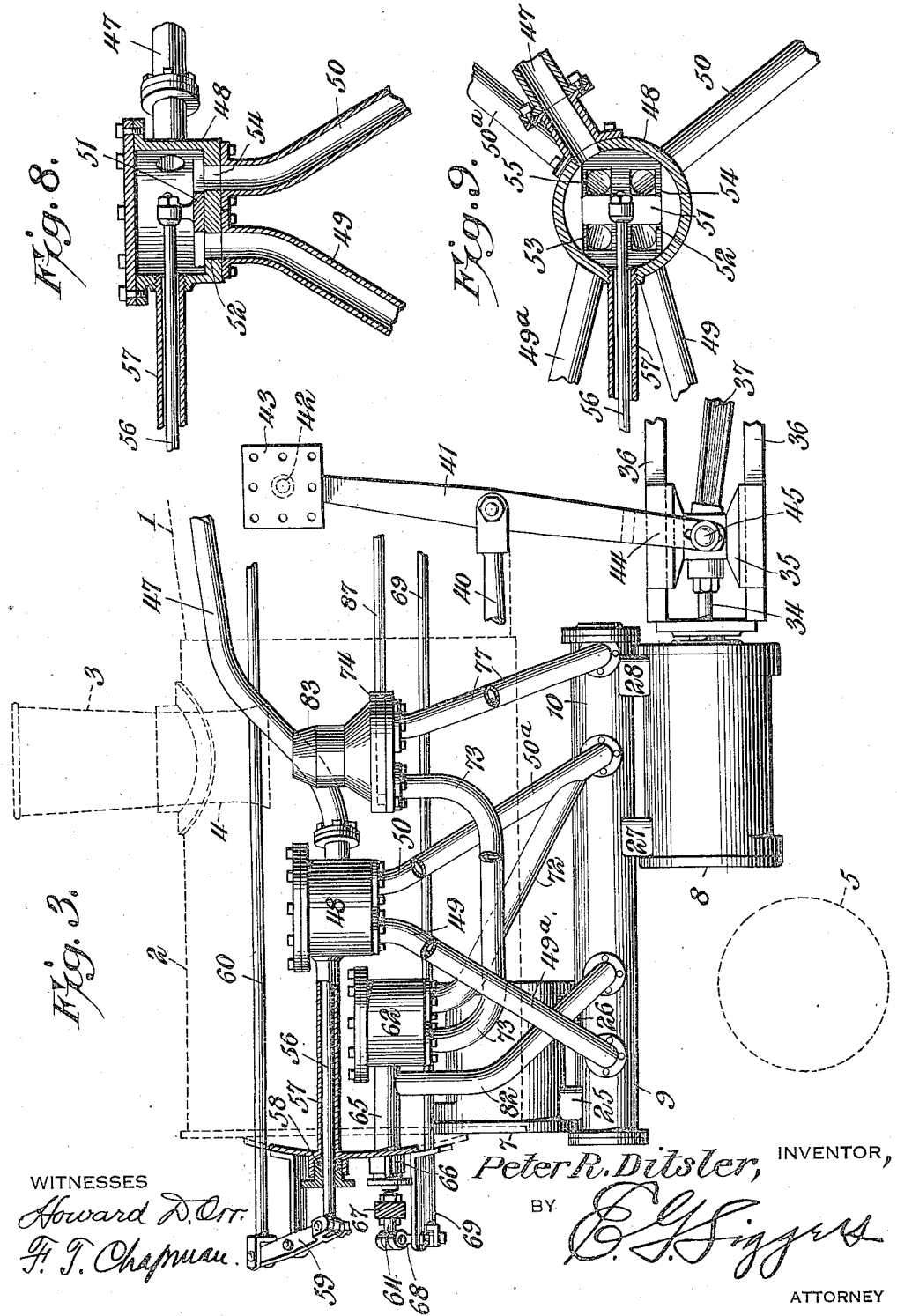

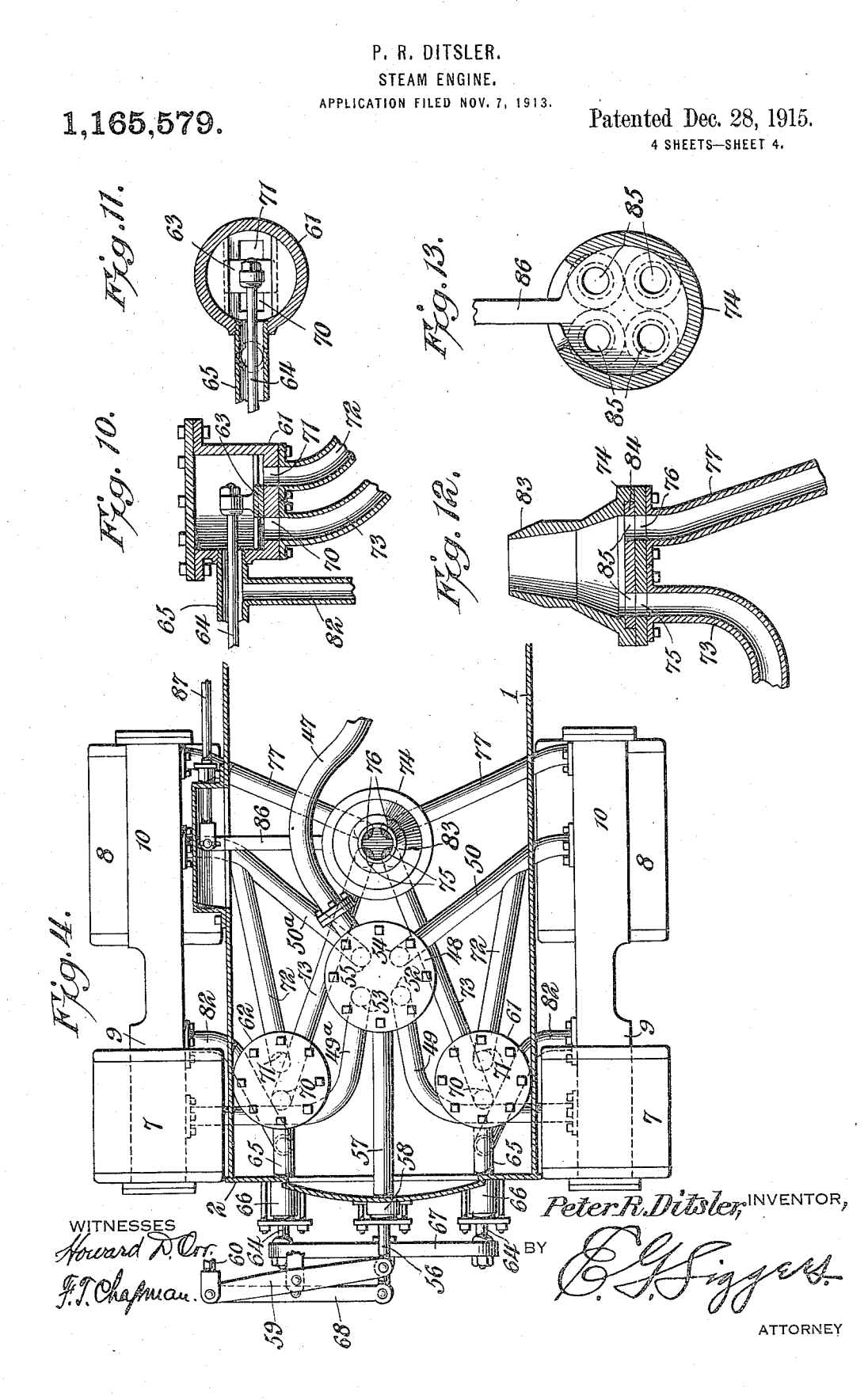

1,165,579.

Patented Dec. 28, 1915.
4 SHEETS—SHEET 4.

UNITED STATES PATENT OFFICE.

PETER R. DITSLER, OF JEFFERSONVILLE, INDIANA.

STEAM-ENGINE.

1,165,579.  Specification of Letters Patent.  Patented Dec. 28, 1915.

Application filed November 7, 1913. Serial No. 799,762.

*To all whom it may concern:*

Be it known that I, PETER R. DITSLER, a citizen of the United States, residing at Jeffersonville, in the county of Clark and State of Indiana, have invented a new and useful Steam-Engine, of which the following is a specification.

This invention has reference to improvements in steam engines, the term steam being employed as typical of any suitable actuating fluid under pressure, and its object is to provide an engine, especially a reciprocating engine, which may be more rapidly and economically operated than ordinary types of reciprocating engines, and whereby an ordinary engine may be changed into an engine of the character of the present invention at a minimum expense as to first cost, and which changed engine may be operated and maintained at a minimum cost.

In accordance with the present invention there are provided two cylinders connected in common to the part to be driven which may be considered as a cross head connected by a single pitman to the usual crank shaft customarily employed in reciprocating engines. In the case of a locomotive the arrangement is such that there are two cylinders on each side of the locomotive, each pair of cylinders being separate from the other pair except for the common connection through the driving wheel axle or axles. In the case of a locomotive engine a valve system is provided whereby boiler steam may be directed to one cylinder of a pair and thence pass to the other cylinder of the pair, so that the two cylinders act as a compound engine, or either or both of the cylinders may receive steam at boiler pressure. The same general arrangement of valves may be employed for a stationary engine or a marine engine, but in the case of a locomotive which really employs two engines, the valve system is somewhat different from the case of a single engine and certain arrangements are provided with respect to the exhaust.

In the present invention one of the cylinders is longer than the other and usually, though not necessarily, the two cylinders are of like diameter. The cylinders being of different lengths it follows that the piston strokes are of correspondingly different lengths, while connecting means are provided to the common cross head or other driven part whereby compensation is made for the difference in stroke of the pistons.

The invention will be best understood from a consideration of the following detailed description, taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention as expressed in the claims.

In the drawings:—Figure 1 is a side elevation of the fore part of a locomotive equipped with the present invention and showing some hidden parts in dotted lines. Fig. 2 is a section on the line 2—2 of Fig. 1, some distant parts being omitted. Fig. 3 in a section on the line 3—3 of Fig. 2 with some parts omitted and the boiler and a portion of the running gear shown in dotted lines. Fig. 4 is a plan view of the valve system and cylinders of the locomotive with a portion of the boiler shown in horizontal section. Figs. 5 to 7 are views illustrating the slide valve structure. Figs. 8 to 11 are views illustrating the steam valves. Figs. 12 and 13 are views illustrating the exhaust nozzle structure.

Referring to the drawings, there is shown a locomotive boiler 1 which may be of ordinary construction, and this boiler is provided with the usual front extension 2 from which rises a smoke stack 3 provided with a depending petticoat 4 within the front extension 2.

The usual bogie structure is simply indicated by wheels 5 and a drive wheel 6 may be taken as indicative of the usual drive wheels of the locomotive. In general the locomotive is assumed to follow the usual lines of construction except in the particulars relating directly to the present invention.

The two sides of the locomotive are alike and hence a description of one side of the locomotive in so far as the present invention is concerned will answer for both sides.

In place of the usual engine cylinder two engine cylinders 7, 8, respectively, are provided, the cylinder 7 being preferably, though not necessarily, in front of and higher than the cylinder 8. Also, the cylinder 7 is shown as of the same diameter as the cylinder 8, this being the preferred relation of these two cylinders with respect to diameter. Moreover, the cylinder 7 is shorter than the cylinder 8, and is usually constructed of about half the length of the cylinder 8, although even in this respect the proportions given are not obligatory.

The cylinder 7 is provided with a slide valve casing 9 and the cylinder 8 is provided with a slide valve casing 10, and while it is not obligatory that these two casings should be in alinement, it is preferred to make them so under certain conditions, especially as it simplifies the valve rigging for the slide valves. With the arrangement shown the valve casing 9 is beneath the cylinder 7 and the valve casing 10 is above the cylinder 8, wherefore the cylinder 7 is higher than the cylinder 8 by about the thickness of one of the slide valve casings. Each casing 9 and 10 carries a respective slide valve 11, 12, the valve 11 consisting of two heads 13, 14, connected by a neck 15, and the valve 12 comprising two spaced heads 16, 17 connected by a neck 18, in this respect following a customary practice in certain types of slide valves.

The two valves are operated by a valve rod 19 entering the casing 10 through a gland 20 and leaving it through another gland 21, and thence extending through a gland 22 into the casing 9. The rod 19 extends through the necks 18 and 15, which necks have respective passages 23, 24 through them so that there is free communication between the opposite ends of each casing 9 and 10 through the respective necks 15 and 18. The slide valves move together because of their common connection with the rod 19 and have like strokes. The interior of the cylinder 7 is connected at its opposite ends by ports 25, 26 with corresponding ends of the interior of the slide valve casing 9, while the cylinder 8 is similarly connected with the interior of the casing 10 by ports 27, 28, respectively. The cylinder 7 contains a piston 29 and the cylinder 8 contains a piston 30. The piston 29 is connected to one end of a piston rod 31, the other end of which is connected to a cross head 32 mounted in guides 33 which may be of customary structure. The piston 30 is connected to one end of a piston rod 34 which at the other end is connected to a cross head 35 mounted to slide in guides 36 as is customary. The cross head 35 is connected to one end of a pitman 37, the other end of which is connected to a wrist pin 38 upon an appropriate one of the drive wheels 6 and the usual connecting links 39 between the wheels are also provided. The cross head 32 is connected by a pitman 40 to an intermediate point of a rock lever 41 mounted upon a pivot pin 42 extending from a base plate 43 made fast to an appropriate point on the boiler 1, while that end of the rock lever 41 remote from the pin 42 is bifurcated as indicated at 44 to straddle the cross head 35, to which latter the rock lever is secured by a pin 45 utilized also to connect the pitman 37 to the cross head 35. The valve rod 19 is connected to a link motion 46 which may follow the customary practice and hence needs no particular description.

In order to supply steam to the cylinders there is provided a main steam pipe 47 coming from the steam dome of the locomotive or other boiler and is assumed to be controlled by the usual throttle valve. The pipe 47 is carried to the interior of the boiler extension 2 where it enters a valve casing 48 from which latter lead pipes 49, 50 and 49$^a$, 50$^a$, the pipes 49 and 49$^a$ leading to the steam inlets of the slide valve casings 9 of the cylinders 7 on the opposite sides of the locomotive. The pipes 50 and 50$^a$ lead to the steam inlets of the slide valve casings 10 on the opposite sides of the locomotive.

In the particular structure shown the pipes 49, 49$^a$, 50 and 50$^a$ enter the casing 48 from below. Arranged to slide within the casing 48 is a valve 51 which is of such size and the openings of the pipes 49, 49$^a$, 50 and 50$^a$ are so located that this valve may blank or cover the openings or ports to the pipes 49 and 49$^a$, these ports being indicated at 52 and 53 respectively, or it may cover or blank the openings or ports to the pipes 50 and 50$^a$, these ports being indicated at 54 and 55, respectively, or the valve 51 may be moved to a position intermediate of these ports so that all four are uncovered at one time. In order to operate the valve 51 it is provided with a stem 56 which in the particular construction shown is carried through the front wall of the front extension 2, a suitable pipe or casing 57 inclosing the valve stem 56 and being connected at one end to the casing 48, and at the other end passing through the front of the extension 2 and there provided with a gland 58 through which the valve stem 56 is carried. Outside the boiler the valve stem 56 is connected to one end of a rock arm 59, the other end of which is connected to the corresponding end of a reach rod 60 which may be extended to the cab of the locomotive in any appropriate manner so that the valve 51 is always under the control of the engine man. In the case of a stationary engine the valve 51 is appropriately arranged for manipulation by the engineer.

Within the extension 2 are other valve casings 61, 62, respectively, and each valve casing incloses a valve 63 provided with a valve rod 64 extending through the front of the extension 2 of the boiler, being inclosed in a pipe 65 connected to the respective casing 61 or 62 in the same manner as the pipe or casing 57. Each pipe or casing 65 is closed at the outer end by a gland 66 through which the respective valve rod 64 extends, and exterior to the gland the two valve rods are connected by a cross head 67 and this cross head is in turn connected to one end of a rock arm 68, the other end of which is connected to a reach rod 69 which may be carried to the engine cab or in the case of a stationary or marine engine, to a position within ready reach of the engineer. Each valve casing 61, and 62 has spaced ports 70, 71, respectively, which in the particular construction shown are at the bottom of the casing, although this is not an obligatory location for these ports. Leading from the port 71 is a pipe 72 entering the pipes 50 or 50ª as the case may be at the other end and close to the connection of the pipe 50 or 50ª with the steam inlet of the respective casing 10. Connected to the port 70 of each casing 61, 62 is a pipe 73 entering an exhaust head 74 through respective ports 75 and also entering this exhaust head 74 by way of ports 76 are other pipes 77 coming from exhaust ports of the valve casings 10. For convenience of description the steam ports of the valve casings 9 are designated by the reference numeral 78 and the exhaust ports of these same casings are designated by the reference numeral 79, while the innlet and exhaust ports of the casings 10 are designated by the reference numerals 80 and 81, respectively.

The exhaust ports 79 of the valve casings 9 are each connected by a pipe 82 to the respective valve casings 61 or 62, and for this purpose the pipe 82 may enter the pipe 65 close to the valve casing 61 or 62, suitable provision being made for the presence of the valve rod 64, so as not to cut down the steam passage.

The exhaust head 74 is provided with a nozzle 83 below and in line with the petticoat 4, so that the exhaust may be utilized for improving the draft on the furnace of the boiler.

Mounted in the exhaust head 74 is a valve 84 which may be in the form of a disk with ports 85 corresponding in number and location with the ports 75 and 76, so that on a partial rotation of the valve 84 the ports 75 and 76 may be correspondingly closed or may be open to their full extent. Fast to the valve 84 is an arm 86 carried through one side of the boiler extension 2 and there connected to a reach rod 87 which may be carried to the cab of the engine within easy reach of the engine man. The nozzle 83 with its valve is particularly valuable in connection with locomotives, but is useful in connection with other types of engines also.

Considering the present invention as applied to a locomotive let it be assumed that it is desirable to start the locomotive. For this purpose it may be advisable to utilize the cylinders 8 alone, in which case the valve 51 is so moved as to close the ports 52 and 53, leaving the ports 54 and 55 of the valve casing 48 open. Now boiler steam coming through the supply pipe 47 to the valve casing 48 finds its way into the pipes 50 and 50ª and so to the inlet ports 80 of the slide valve casing 10. Assuming the slide valve 12 to be in proper position, steam finds its way through one of the ports 27 or 28, say the port 28, into the cylinder 8 behind the piston 30, and hence drives the piston toward the other end of the cylinder, in the usual way, the exhaust port 27 being then open so that any exhaust which may occur passes into the casing 10 and through the passage 24 in the stem 18 to the exhaust port 81, finding escape through the respective pipe 77 and port 76 of the exhaust head 74, it being assumed that the valve 84 is then so set as to leave the ports 76 fully open. After the engine has attained the desired speed the valves may be manipulated to bring the cylinders 7 into operation, so that each pair of cylinders 7 and 8 acts as a compound engine. For this purpose the valve 51 is moved in a direction to uncover the ports 52 and 53 and to cover the ports 54 and 55, thus shutting off the boiler or live steam from direct access to the cylinders 8. Live steam now passes by way of the pipes 49 and 49ª to the live steam ports 78 of the valve casings 9 and if the valve 11 is in suitable position the steam will pass through the port 26 of each cylinder to the interior thereof and impel the piston 29 in the appropriate direction. The exhaust side of each cylinder 7 is connected by way of the port 25 then acting as the exhaust port, to the interior of the casing 9, thence through the passage 23 in the stem 15 to the exhaust port 79 of the casing 9. When the valve 51 was shifted to open the ports 52 and 53 and close the ports 54 and 55 the valves 63 were simultaneously adjusted to close the ports 70 and open the ports 71 of the valve casings 62 and 63. Now the exhaust pipes 82 connecting the ports 79 with the valve casings 61 and 62 receive the exhaust from the cylinders 7 and this exhaust is led directly through the ports 71 and pipes 72 to the intake ports 80 of the casings 10 and thence to the interior of the cylinders 8 to actuate the pistons 30 therein.

Suppose that there should be an extra demand upon the locomotive for power, then the valves 63 are shifted so that the high pressure cylinders 7 have the exhaust pipes 82 connected to the valve casings 61 and 62 directly with the ports 70 and pipes 73, while the valve 51 is so adjusted that all four ports 52, 53, 54 and 55 are open to the admission of live steam from the pipe 47. Under these circumstances both cylinders 7 and 8 are receiving live steam and are exhausting directly to the atmosphere through the exhaust head 74, wherefore both cylinders are working under full steam pressure. Again, let it be assumed that because of an accident or for any other reason the cylinders 8 be out of service, then the valve 51 is moved to close the ports 54 and 55 and the valves 62 are so moved as to close the ports 71 and open the exhaust of the cylinders 7 directly to the exhaust head 74. Under these circumstances the cylinders 7 would carry the entire load.

It will be observed that when the two cylinders 7 and 8 are working simultaneously under full steam pressure the steam course from the supply pipe 47 is unimpeded in any way and is the same to each cylinder as though that cylinder alone was receiving the full steam pressure of the boiler.

The valve 84 is useful where for any reason it is desirable to produce an increased back pressure in either cylinder, for then the ports 75 and 76 may be reduced in effective area to the desired extent and even where only one cylinder of a pair is being used movement of air through the exhaust side of the other cylinder is not at all prevented by the valve 84.

The slide valve 11 is so arranged and related to the ports 25 and 26 and the slide valve 12 is so arranged and related to the ports 27 and 28 that steam to the high pressure cylinder 7 is cut off sooner than is customary, and at the same time the ports 25 and 26 are so large that when open for the entrance of steam the latter has free course in large volume to the cylinder, and hence the boiler pressure is established within the cylinder with great rapidity, while exhaust steam from the high pressure cylinder continues to flow to the intake side of the low pressure cylinder and exhaust from the latter continues to escape through practically the full strokes of both of the pistons 29 and 30.

The piston 29 being as large in area as the piston 30 and being acted upon by much higher steam pressure, develops a much higher power so long as subjected to full boiler pressure, and this pressure continues to act upon the piston 29 with as high or higher power than the steam acting upon the piston 30 while the engine is operating as a compound engine. Moreover, the stroke of the piston 29 being materially shorter than that of the piston 30 correspondingly reduces the vibration of the engine as compared with compound engines where the strokes of the two pistons are alike, and, furthermore, the high pressure cylinder can deliver steam at a higher pressure to the low pressure cylinder than where the high pressure piston stroke is more extended. The cylinder 7 will have the same capacity as the small bore cylinders of customary types of compound engines, but the stroke is materially less and may actually be only half as long as that of the low pressure piston.

While the ordinary type of link motion for controlling the slide valves of the two cylinders has been shown, it will be understood that any of the more modern types of link motions may be employed. It will be further understood that the question of cut off with respect to the high pressure cylinder when the engine is operating as a compound engine, or of either cylinder when operating as in simple engines, may be in accordance with the judgment of the engineer.

What is claimed is:—

1. An engine provided with two cylinders of different axial lengths and correspondingly different strokes of their pistons, a crank shaft, direct driving connections between the piston of longer stroke and the crank shaft for imparting to the latter the same stroke as said piston, motion-multiplying connections between the piston of shorter stroke and said direct driving connections, the cylinder having the piston of shorter stroke having its longitudinal center line to one side of the longitudinal center line of the cylinder having the piston of longer stroke, and alined mechanically connected slide valves intermediate of the two cylinders with the longitudinal center line of the connected slide valves parallel with the longitudinal center lines of the respective cylinders, and the slide valves being each located closely adjacent to the respective cylinder.

2. An engine provided with two cylinders of different axial lengths and correspondingly different strokes of their pistons, a crank shaft, direct driving connections between the piston of longer stroke and the crank shaft for imparting to the latter the same stroke as said piston, motion-multiplying connections between the piston of shorter stroke and said direct driving connections, and alined mechanically connected slide valves, one for each cylinder, the alined slide valves and the cylinders having their longitudinal center lines parallel with each other with each slide valve located closely adjacent to the respective cylinder, and the cylinders being located on opposite sides of the connected slide valves and displaced in the direction of the length of the connected slide valves corresponding to the longitudinal spacing of the two slide valves.

3. An engine comprising two cylinders of different axial lengths with pistons of correspondingly different strokes, a driven member to which both pistons are connected, and slide valves individual to the respective pistons, said slide valves being mechanically connected together in one longitudinal center line with the respective cylinders on opposite sides of the connected slide valves and correspondingly spaced apart in the direction of the length of the connected slide valves.

4. A reciprocating engine provided with two cylinders of different axial lengths having pistons of correspondingly different strokes, and a driven member, the cylinder of shorter length being located above and more distant from the driven member than the longer cylinder, and said engine being also provided with connected slide valves for the respective cylinders located below the shorter cylinder and above the longer cylinder and arranged and mechanically connected in line one with the other, and connections between the pistons of the two cylinders and said driven member.

5. A reciprocating engine provided with two cylinders of different axial lengths having pistons of correspondingly different strokes, and a driven member, the cylinder of shorter length being located above and more distant from the driven member than the longer cylinder, and said engine being also provided with connected slide valves for the respective cylinders located below the shorter cylinder and above the longer cylinder, and arranged and mechanically connected in line one with the other, said slide valves also differing in length in correspondence with the difference in length of the respective cylinders and the pistons of the two cylinders and the slide valves being connected to the driven member for actuation thereby with the driving means for the slide valves imparting the same length of stroke to both slide valves.

6. An engine provided with high and low pressure cylinders, a driven member common to both cylinders, driving connections between the two cylinders and the driven member, and means for directing motive fluid under pressure directly to the high pressure cylinder, and thence to the low pressure cylinder, or to both cylinders simultaneously, or to either cylinder separately, at will.

7. A reciprocating engine having two cylinders of different lengths and like cross sectional areas, a driven member, driving connections from both cylinders to the driven member, and means for compounding the two cylinders or supplying them with live steam simultaneously or separately, at will.

8. An engine having two cylinders, means for compounding or supplying them with live steam simultaneously or separately, at will, exhaust means individual to the cylinders and having a common outlet, and means for throttling the outlet to desired extent, at will.

In testimony, that I claim the foregoing as my own, I have hereto affixed my signature in the presence of two witnesses.

PETER R. DITSLER.

Witnesses:
JOHN H. SIGGERS,
JNO. R. RAY.

Copies of this patent may be obtained for five cents each, by addressing the "Commissioner of Patents, Washington, D. C."